(12) United States Patent
D'Amore et al.

(10) Patent No.: US 9,235,589 B2
(45) Date of Patent: Jan. 12, 2016

(54) OPTIMIZING STORAGE ALLOCATION IN A VIRTUAL DESKTOP ENVIRONMENT

(71) Applicant: International Business Machines Corporation, Armonk, NY (US)

(72) Inventors: Cristiana D'Amore, Rome (IT); Pietro Iannucci, Rome (IT); Luigi Pichetti, Rome (IT); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 13/681,605

(22) Filed: Nov. 20, 2012

(65) Prior Publication Data

US 2013/0152085 A1 Jun. 13, 2013

(30) Foreign Application Priority Data

Dec. 13, 2011 (EP) ..................................... 11193141

(51) Int. Cl.
*G06F 17/30* (2006.01)
*G06F 9/455* (2006.01)
*G06F 9/44* (2006.01)

(52) U.S. Cl.
CPC .......... *G06F 17/3015* (2013.01); *G06F 9/4445* (2013.01); *G06F 9/455* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 5,813,008 A | 9/1998 | Benson et al. |
| 6,810,398 B2 | 10/2004 | Moulton |
| 7,293,154 B1 | 11/2007 | Karr et al. |
| 7,584,228 B1 | 9/2009 | Protassov et al. |
| 8,516,597 B1 * | 8/2013 | Sharma et al. .................. 726/25 |
| 2006/0123062 A1 | 6/2006 | Bobbitt et al. |
| 2009/0063795 A1 | 3/2009 | Yueh |
| 2009/0204650 A1 | 8/2009 | Wong et al. |
| 2010/0094817 A1 | 4/2010 | Ben-Shaul et al. |
| 2010/0274784 A1 | 10/2010 | Acharya |
| 2010/0299667 A1 | 11/2010 | Ahmad et al. |
| 2013/0013865 A1 * | 1/2013 | Venkatesh et al. ............ 711/133 |

OTHER PUBLICATIONS

Examination Report under Section 18(3) dated Aug. 14, 2013 for Application No. GB1221901.0, 3 pages.

(Continued)

*Primary Examiner* — Richard Bowen
(74) *Attorney, Agent, or Firm* — Stephen J. Walder, Jr.; Thomas E. Tyson

(57) ABSTRACT

Mechanisms for optimizing the storage allocation in a virtual desktop environment (VDE) managing a shared storage capacity, are provided. The shared storage capacity includes previously stored files, each being associated with a respective unique first file identifier, the VDE providing a virtual desktop to a processing device of a user. Upon reception of a first write request for writing a second file specified in the request, a second file identifier of the specified second file is determined and compared with the first file identifier of any first file stored to the shared storage capacity. A pointer to the stored first file associated with that first file identifier is created if the second file identifier is identical to one of the first file identifiers and, if not, the specified second file associated with the second file identifier is stored in the shared storage capacity.

20 Claims, 3 Drawing Sheets

(56) References Cited

OTHER PUBLICATIONS

"Data deduplication", Wikipedia, http://en.wikipedia.org/wiki/Data_deduplication, accessed on Nov. 20, 2012, 8 pages.

"Single-instance storage", Wikipedia, http://en.wikipedia.org/wiki/Single-instance_storage, accessed on Nov. 20, 2012, 2 pages.

"Understanding Clones", VMware Workstation 5.5, http://www.vmware.com/support/ws55/doc/ws_clone_oveview.html, accessed on Nov. 20, 2012, 2 pages.

Bolosky, William J. et al., "Single Instance Storage in Windows 2000", USENIX, Proceedings of the 4th USENIX Windows Systems Symposium, 2000, 12 pages.

Combined Search and Examination Report under Sections 17 and 18(3) dated May 21, 2013 for Application No. GB1221901.0, 7 pages.

"Data Deduplication", http://www.uptimenmi.com/articles/novell/data-deduplication, see "in-line deduplication", 2010, 2 pages.

"Demystifying Data Deduplication", http://www.symantec.com/connect/blogs/demystifying-data-deduplication, see "client deduplication", 2010, 1 page.

"Tivoli Access Manager for Operating Systems documentation, Version 6.0", IBM Corporation, http://pic.dhe.ibm.com/infocenter/tivihelp/v2r1/index.jsp?topic=%2Fcom.ibm.itamos.doc%2Fwelcome.htm, 2006, accessed on Jan. 3, 2013, 2 pages.

* cited by examiner

OPTIMIZING STORAGE ALLOCATION IN A VIRTUAL DESKTOP ENVIRONMENT

BACKGROUND

The invention relates to virtual environment systems, and more particularly to a method for optimizing the storage allocation in a virtual desktop environment.

Computer virtualization has become one of the more important technologies for different sized companies. Computer virtualization increases the computational efficiency and flexibility of a computing hardware platform. Using, in particular, storage virtualization in a virtual desktop environment is also becoming a critical part of business computing in these companies.

In a Virtual Desktop environment, the local file system assigned for each desktop is a chunk of dedicated virtualized storage taken from a physical storage pool. Each time a user saves a file to his/her file system, a copy of this file is stored on the dedicated chunk of physical storage for that desktop. In the case where several virtual desktop users, belonging to the same business context, are saving the same file to their file system, the result is that several copies of that same file are likely to be stored on the common physical storage. This redundancy causes unnecessary usage of extra storage, thereby making it necessary to acquire larger storage volumes than actually required.

Another problem related to the usage of other state of the art systems is that the users have to use a predefined or shared directory tree structures and are not able to store their files in a user-specified location. The users of such systems are also not able to modify the directory structure of the shared storage volume as this would confuse other users assuming their files to be still available via the original file path.

SUMMARY

It is an objective of embodiments of the invention to provide for an improved computer-implemented method, data processing system and corresponding computer-readable storage medium. Said objective is solved by the subject matter of the independent claims. Advantageous embodiments are described in the dependent claims.

In one aspect, the present invention relates to a method for optimizing storage allocation in a virtual desktop environment, the virtual desktop environment managing a shared storage capacity, wherein the shared storage capacity is operable to store one or more first files, each stored first file being associated with a respective unique first file identifier, the virtual desktop environment providing at least one virtual desktop to a processing device of a user. The method comprises:

receiving a first write request for writing a second file specified in the request;
determining a second file identifier of the specified second file;
comparing the second file identifier with the first file identifier of any first file stored to the shared storage capacity;
when the second file identifier is identical to one of the first file identifiers, creating a pointer to the stored first file associated with that first file identifier; and
when the second file identifier is not identical to anyone of the first file identifiers, storing the specified file associated with the second file identifier in the shared storage capacity, wherein the second file identifier is stored as a further first file identifier and the second file is stored as a further first file, and creating the pointer to the stored further first file.

This illustrative embodiment may be advantageous because the method prevents storage of identical files in the shared storage capacity and also allows different users to access the same stored file. This not only conserves, in a pro-active manner, storage space, but also to improves storage performance. This is in contrast to a post-storage de-duplication method which only acts when the files are already duplicated on the storage area.

According to another illustrative embodiment, the pointer is created in a local file system of the virtual desktop. The local file system may be stored in a user-private storage area which is accessible only by the user. According to another illustrative embodiment, the first write request is received from the at least one virtual desktop, and the pointer is created in the local file system of the virtual desktop.

According to another illustrative embodiment, the method further comprises receiving a specification of a path within the local file system of the at least one virtual desktop from the user of the at least one virtual desktop. The pointer is created at a location within the local file system indicated by the specified path. According to some illustrative embodiments, the user may specify the path via a GUI element, e.g., a file selector, allowing the user to navigate within an existing local file system directory tree. Thus, contrary to some state of the art systems, a user is allowed to specify a file path in his/her own local directory and does not have to remember and accept a predefined shared file directory structure. In addition, the duplication of the files being stored in the shared storage capacity is avoided.

Such illustrative embodiments may be advantageous in that the user requesting to write a file in a specific folder of his virtual desktop will see that the file has been created with the desired characteristics on the local file system (e.g., filename, folder location, etc.) although in reality, the local file system will only have a link to the actual physical file that it is stored on the shared storage capacity. According to some illustrative embodiments, the local file system of the user is stored in a user-private storage medium of the user. The user-private storage is also managed by the virtual desktop environment.

According to another illustrative embodiment, the first and/or second file identifier is a file Cyclic Redundancy Check number, Hash number, SHA-1 or MD5 of the respective file associated with the identifier. This may have the advantage of providing a robust method to calculate a unique identification number, such that different files have different identifiers. This allows checking whether the file being requested for storage is or is not one of the previously stored files on the shared storage capacity.

According to another illustrative embodiment the method further comprises: upon storing any of the first files and upon storing the second file in the shared storage capacity, associating the first and/or second file with an access control list comprising user IDs of all users having access to the stored first or second file. In addition, or alternatively, upon storing any of the first files and upon storing the second file in the shared storage capacity, the method comprises associating the stored file with a reference count representing the number of users having access to the stored first or second file. This illustrative embodiment may be advantageous because it ensures a secure and controlled access to the stored files, since they are protected by allowing access only to the users whose user IDs are indicated in the access control list.

According to some illustrative embodiments, only user IDs of users allowed to access a stored file are contained in the file access list of the stored file. Another advantage may be that the number of users having access to a stored file is simply obtained by reading a reference count which is a single number. This is a faster process than reading and deriving such number from the access control list of the stored file by, for example, counting the number of users identified in the access control list.

According to another illustrative embodiment, the method further comprises receiving a delete request from the user. The delete request is indicative of one of the first files. Upon having received the delete request, the user ID of the user having submitted the delete request is deleted from the access control list of that file indicated in the delete request. According to another illustrative embodiment, in this case the reference count is decremented in addition to removing the user ID. This ensures that the access control list and the reference count keep representing the exact number of users having access to the file. According to another illustrative embodiment, in this case the pointer of that file stored in the local file system of the user's virtual desktop is deleted as well. Also, if the reference count is equal to zero, the file is deleted from the shared storage capacity.

According to another illustrative embodiment, the step of storing the specified second file further comprises the steps of: creating the access control first and/or the reference count for the specified second file; and adding the user ID to the access control list and/or incrementing the reference count. According to another illustrative embodiment, the step of creating the pointer comprises adding the user ID to the access control list of the file the pointer is directed at and/or incrementing the reference count.

According to another illustrative embodiment, the method further comprises: receiving a second write request for writing the second file; creating a second pointer to the existing first file having been stored in response to the first write request, the second pointer being created in the local file system of the virtual desktop of a user having submitted the second write request. According to an illustrative embodiment, the first and the second write request are received from the same user and the reference count remains unchanged. This has the advantage of giving the user flexibility to organize his/her own files in the file system, for example, by storing the same file in different locations without constraints. At the same time the features permit keeping only one copy of the file in the shared storage capacity. According to some illustrative embodiments, in case the first and the second write request are received from different users, the reference count and the file access list is updated accordingly.

According to some illustrative embodiments, the method further comprises:
  receiving an update request from the user, the update request being indicative of one of the first files which is to be modified by the user;
  storing the modified first file in the shared storage capacity; and
  creating a pointer to the modified file in the local file system of the user.

According to some illustrative embodiments, the method further comprises deleting the pointer pointing to the stored modified first file.

According to embodiments, the modification of the file is executed by creating a modified local copy F' of the first file F to be modified, the local copy being stored to the local file system of the user, and executing a write request as described beforehand for writing the modified local copy F.

According to one embodiment, the virtual desktop is provided by the virtual desktop environment as an instance of a virtual machine image, and a graphical user interface of the virtual desktop is displayed on a screen of a user-specific processing device to the user of said processing device. Depending on the embodiment, the processing device may be a smartphone, a netbook, a workstation, or the like. In particular, the processing device may be a thin client processing device having only limited hardware resources.

According to another illustrative embodiment, the user is one of a plurality of users respectively having assigned a user-specific processing device. The virtual desktop is one out of a plurality of virtual desktops. Each of the plurality of virtual desktops is provided to one of the processing devices by the virtual desktop environment. A server hosting the virtual desktop environment is connected to each of the user-specific processing devices via a network. The steps executed by embodiments of the present invention as described above may be executed by a storage infrastructure manager running on the server.

In a further aspect, the invention relates to a computer-readable non-transitory storage medium comprising computer-readable instructions which, when executed by a processor, cause the processor to perform the method steps of anyone of the above embodiments.

In another aspect, the invention relates to a computer system for optimizing the storage allocation in a virtual desktop environment, the virtual desktop environment managing a shared storage capacity, wherein the shared storage capacity includes one or more previously stored files, each stored file being associated with a respective unique first file identifier, the virtual desktop environment providing at least one virtual desktop to a processing device of a user. The computer system comprises:
  the shared storage capacity; and
  a server processing device hosting a virtual storage infrastructure manager, wherein the virtual storage infrastructure manager is adapted for:
    receiving via the virtual desktop environment a first write request for writing a second file specified in the request;
    determining a second file identifier of the specified file;
    comparing the second file identifier with each of the first file identifiers of any first file having been stored to the shared storage capacities;
    when the second file identifier is identical to one of the first file identifiers, creating a pointer to the stored first file associated with that first file identifier; and
    when the second file identifier is not identical to anyone of the first file identifiers, storing the specified second file associated with the second file identifier in the shared storage capacity wherein the second file identifier is stored as a further first file identifier and the second file is stored as a further first file, and creating a pointer to the stored further first file.

According to another illustrative embodiment, the client processing device is connected to the server processing device via a network and is operable to request the virtual desktop from the virtual desktop environment via said network. According to further embodiments, the client device is one of a plurality of client devices respectively assigned to one of a plurality of different users, each of the client devices being operable to request a virtual desktop from the virtual desktop environment via the network.

According to some illustrative embodiments, the virtual desktops provided to each of the client devices comprises GUI elements which respectively represent the pointers having been created upon a write request of the user of the respective client device. The visible properties of said GUI elements, e.g., color, icon type and the like, are identical to GUI elements used by the respective virtual desktop environment for displaying files, thus giving the user the impression of working with a real file instead of a link.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a 'module' or 'system'. Any combination of one or more computer-readable medium(s) may be utilized.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
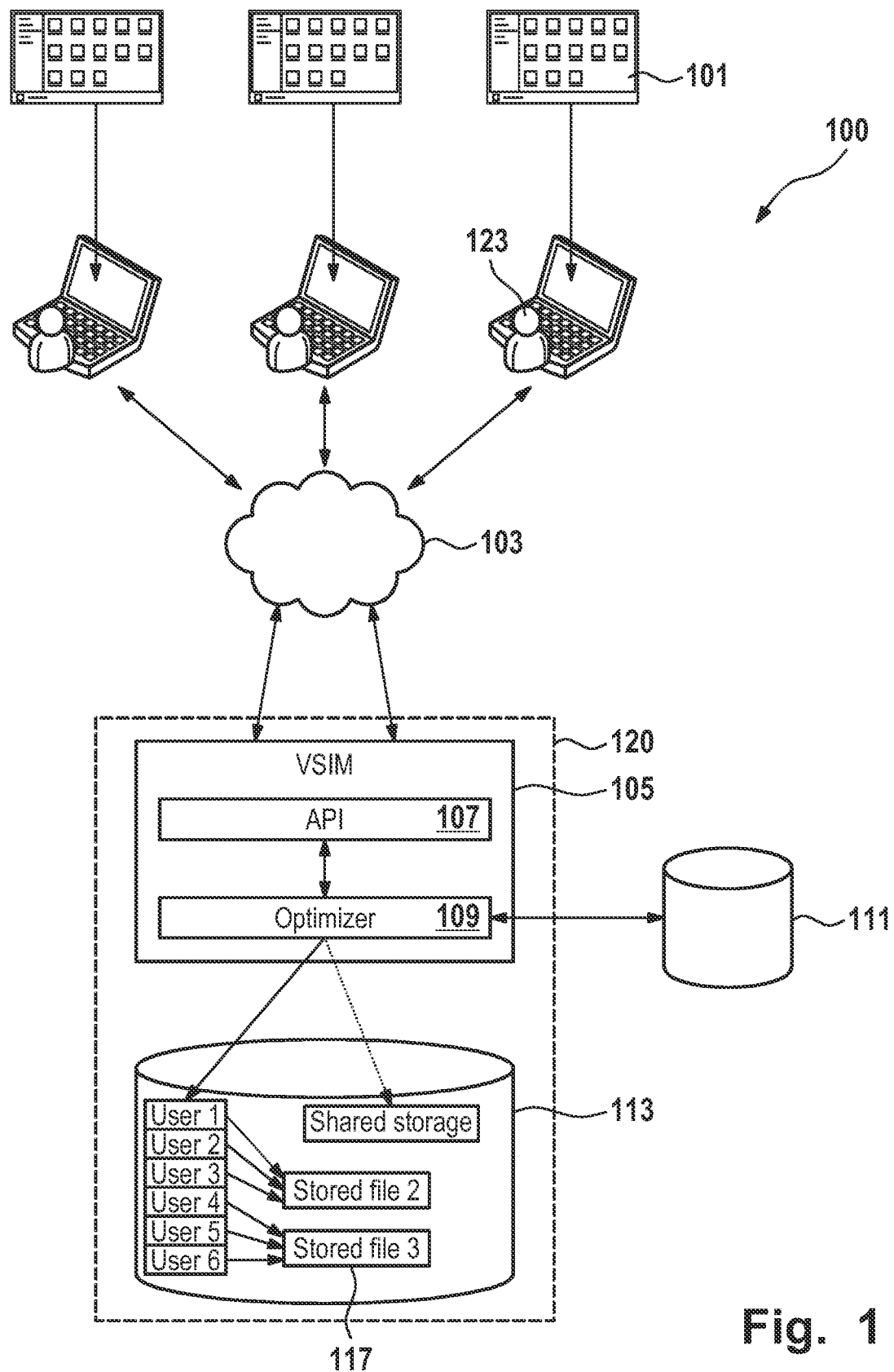
FIG. 1 illustrates system architecture for the execution of a method for optimizing the storage allocation in a virtual desktop environment.

As noted above, the invention relates to virtual environment systems, and more particularly to mechanisms for optimizing the storage allocation in a virtual desktop environment. The term "virtual desktop" as used herein is a virtual machine physically located in a data storage managed by a virtual desktop environment. In particular, the virtual desktop may be provided by the virtual desktop environment running on a server instead of on the local storage of a client. Thus, according to some embodiments, when users work from their local client machines, all the programs, applications, processes and data used are kept on the server and are run centrally. Desktop virtualization allows users to run operating systems and applications from a smartphone or from any other form of thin client having limited hardware resources. According to some other applications and embodiments, the virtual desktops may be loaded temporarily into the working memories of the client devices while any modification of data is persisted only in storage volumes managed by the server.

The term "computer-readable storage medium," as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks.

The term computer readable-storage medium also refers to various types of recording media capable of being accessed by the computer device via a network or communication link. For example data may be retrieved over a modem, over the internet, or over a local area network. References to a computer-readable storage medium should be interpreted as possibly comprising multiple computer-readable storage mediums. Various executable components of a program or programs may be stored in different locations. The computer-readable storage medium may for instance comprise multiple computer-readable storage medium within the same computer system. The computer-readable storage medium may also be computer-readable storage medium distributed amongst multiple computer systems or computing devices.

The term "metadata repository" as used herein encompasses a storage medium or part thereof having stored metadata. For example, the metadata repository may be implemented as a database system being designed to support the storage, use and retrieval of metadata by a processor. Metadata may include, for example, information about how to access specific data, or more detail about said data.

The term "application programming interface (API)" as used herein refers to an interface that software programs implementing said interface use to interact with each other; much in the same way that software might implement a user interface in order to allow humans to interact with it. APIs are implemented by software applications (SAs), libraries and operating systems to define how other software can make calls to or request services from them. An API determines the vocabulary and calling conventions that the programmer should employ in order to use the services. It may include specifications for routines, data structures, object classes, and protocols used to communicate between a consumer and an implementer of the API.

The term "access control list (ACL)" as used herein refers to an indication, in any security framework (e.g., access control framework, mandatory access control framework, discretionary access control framework, lattice based access control framework, etc.), of users and/or groups of users permitted access to a file. According to embodiments, the level of permitted access (e.g., read-only, read-write, delete, etc.) may also be indicated in the access control list.

The term "computer memory" or "memory" is an example of a computer-readable storage medium. Computer memory is any memory which is accessible by a processor. Examples of computer memory include, but are not limited to: RAM memory, registers, and register files. In some instances a computer memory may also include: a hard disk drive, a floppy drive or a solid state hard drive. For instance, part of a memory may in fact be swap space on a hard drive. References to "computer memory" or "memory" should be interpreted as possibly comprise multiple memories. The memory may for instance comprise multiple memories within the same computer system. The memory may also comprise multiple memories distributed amongst multiple computer systems or computing devices.

The term "processor" as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems.

In the following, like numbered elements in the figures either designate similar elements or designate elements that perform an equivalent function. Elements which have been discussed previously will not necessarily be discussed in later figures if the function is equivalent.

FIG. 1 depicts a system architecture 100 operable to execute a process of optimizing the storage allocation in a virtual desktop environment. The term "virtual desktop environment" as described herein means a system having distributed resources for providing desktop services to end users.

The system 100 provides thin clients 123, which are communicatively coupled to a shared storage capacity 113 via a virtual storage infrastructure manager (VSIM) 105 and a computer network 103 such as the internet. The virtual storage infrastructure manager 105 has access to the shared data storage 113 via a space optimizer 109. The space optimizer 109 may be an integral part of or may be operatively coupled to the virtual storage infrastructure manager running on a remote server 120. The server 120 can perform any server function and may comprise, for example, data servers, application servers, or web servers.

The thin client 123 may be, for example, a networked desktop computing device without local storage. It may have a lightweight embedded operating system or firmware and provides user authentication, network/server access, remote display, and support for input/output including keyboard, mouse, local USB, and printing capabilities. The thin client 123 runs a virtual desktop through its connection to the server 120. The virtual desktop may provide one or more views displayed via a graphical user interface (GUI) 101 of the thin client 123 to a user. The thin client 123 is acting as interface between the user and the shared storage capacity 113. The thin client 123 is specific to the user, and displays GUI elements representing elements of a local file system to said user. The local file system of the user is adaptable by the user, thus allowing the user to determine the organization of the files owned to the user. The local file system may contain a user-private storage 316,317 (cf. FIG. 3) wherein file pointers pointing to files accessible by said user may be stored.

An application programming interface (API) 107 handles requests from the virtual desktop user and returns responses to those requests. The requests may be, for example, CRUD (create, read, update, delete) operations. These requests are forwarded to the space optimizer 109. The space optimizer 109 enables and manages the requests, such as the CRUD operations, and translates user requests into requests to the shared storage capacity 113 to retrieve and store information. The API interface 107 is under control of the VSIM and isolates the virtual desktops 310 depicted in FIG. 3 from directly interacting with the shared storage capacity 113.

The shared storage capacity 113 is operatively coupled to the server 120. For example, the shared storage capacity may be part of the server or accessible by the server via a network. The shared storage capacity 113 may consist of one or more interconnected storage devices, such as a RAID, for storing data files. The system 100 provides information on the stored files 117. The information comprises, for example, an access control list, a file identifier, a reference count number describing the number of users having access to a file, etc. This information is stored in a metadata repository 111. The metadata repository 111 is operatively coupled to the space optimizer 109 for exchanging that information.

Figure 2:
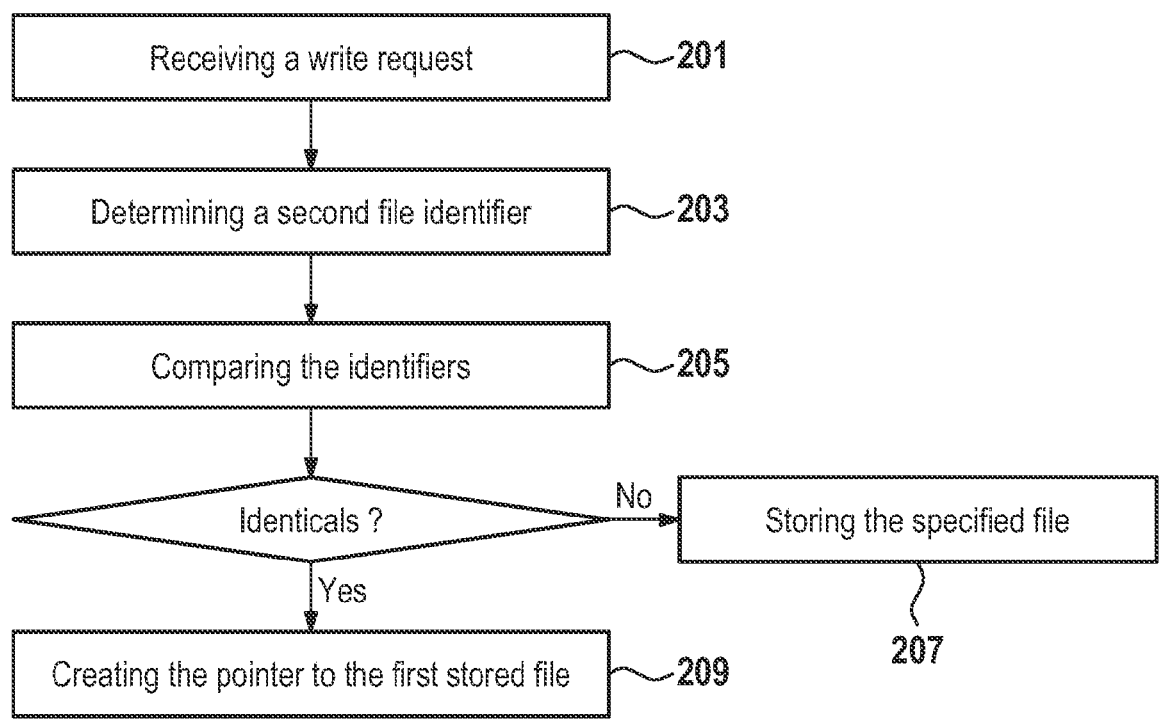
FIG. 2 is a flowchart of a method for optimizing the storage allocation in a virtual desktop environment.

FIG. 2 is a flowchart of a method for optimizing the storage allocation in a virtual desktop environment. In step 201, the API 107 of the VSIM 105 receives requests to write a specific file in the shared storage capacity 113. The request being triggered, for example, by a user saving a specific file attached to his/her email in one user-private storage. The user-private storage comprises a local file system of a virtual desktop. The virtual desktop is provided to the thin client 123. The API forwards the request to the space optimizer 109. The space optimizer 109 in step 203 calculates a second identifier for the specified file. The second identifier may include, for example and without limitation, a file Cyclic Redundancy Check number, Hash number, SHA-1 or MD5. In step 205, the space optimizer 109 compares the second identifier of the specified file being requested with the first identifiers of the files previously stored in the shared storage capacity 113. The space optimizer 109 retrieves the identifiers of the stored files from the metadata repository 111.

In case the second identifier is identical to one of the first file identifiers, the space optimizer first adds the user CD to an access control list and/or increments a reference count associated with the stored file having the first identifier identical to the second identifier. The access control list and the reference count are then stored in the metadata repository 111. Next, the space optimizer 109 creates a pointer to the existing stored file associated with that first identifier. In step 209, the pointer is created in the user-private storage comprising the local file system of the virtual desktop requested by the user. The user-private storage may be a logical volume or a physical storage volume. When the specified file is requested a second time, by the same user, for writing said file in a second location within the same directory tree of the file system of the virtual desktop, a second pointer is created which points to the existing first file in the user-private storage of the user. In this case the reference count remains unchanged.

In case the second write request was received from a second user, the other user requesting to write a file having already been stored by the first user, a pointer pointing to the existing file in the shared storage capacity 113 is created in the local file directory of a user-private storage of said second user. For example, the second user may use a second thin client. The second thin client operates a second virtual desktop displaying graphical references of elements of a local file directory tree defined by said second user. In this case, the reference count is updated.

In case the second file identifier is not identical to anyone of the first file identifiers, the space optimizer 109 will first create an access control list and/or a reference count for the specified file, and adds the user ID to the access control list and/or increments the reference count. The access control list and the reference count are then stored in the metadata repository 111. Next, in step 207, the space optimizer 109 stores the specified file associated with the second file identifier in the shared storage capacity 113 and create a new pointer to the specified file in the user-private storage comprising the local file system of the virtual desktop chosen by the user. The second identifier is then stored as a further first identifier.

There is another use case where the user is requesting a deletion of one of the previously stored files in the shared storage capacity. In this case, the user ID of that user is removed from the access control list of that file, and the reference count of that file is decremented.

Figure 3:
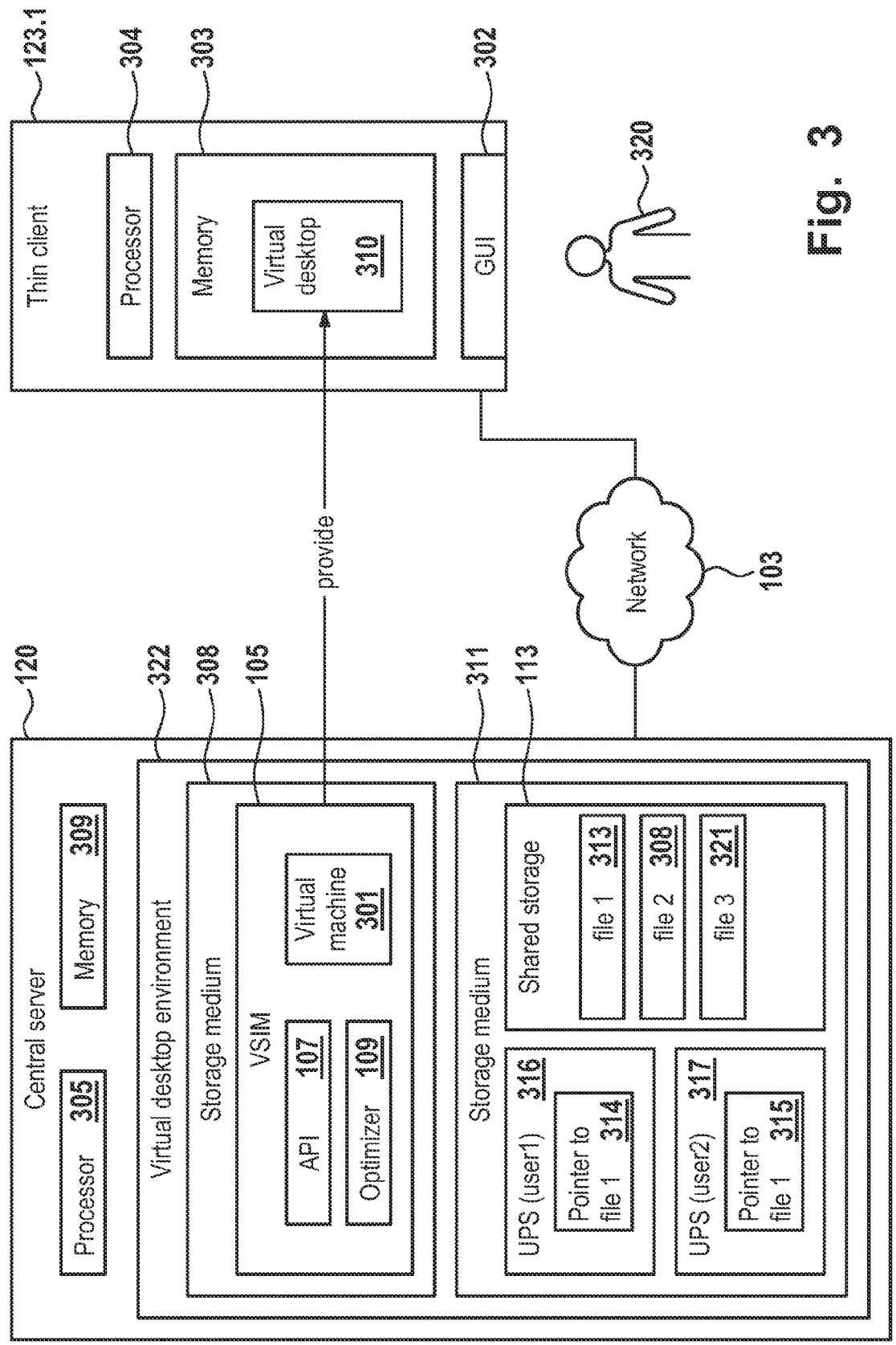
FIG. 3 is a block diagram of a server processing device and a client processing device.

FIG. 3 depicts a virtual desktop environment comprising a server processing device 120 being connected to a client processing device, e.g., a thin client 123.1 via a network 103, e.g., the Internet or an intranet. The thin client 123.1 comprises a processor 304 and a working memory 303. The working memory 303 comprises user data and program instructions of a virtual desktop 310 having been provided via the network 103 by the virtual storage infrastructure manager 105 being operated by the server 120. The virtual desktop 310 is an instance of a virtual machine image 301 and may provide a graphical user interface 302 which is displayed to the user 320 of the thin client 123.1 on a screen of the thin client 123.1.

The graphical user interface displayed to the user 320 may comprise graphical user interface elements (GUI elements) representing file pointers stored in storage medium 311. The storage medium 311 is operatively coupled to the server 120 and may comprise a shared storage capacity 113 and one or more user-private storages (UPS) 316, 317. The shared storage capacity 113 may comprise one or more files 313, 308, 321. Each of the files may have assigned an identifier of one or more users being allowed to access that file. The data content of any of the user-private storages comprises data, in particular the file pointers, which are accessible only by one particular user to whom said user-private storage is assigned. For example, UPS 316 may be assigned to user 320.

User 320 may create and modify a directory tree and may request to write a file into a particular location of said file tree, whereby the path to that location was specified by the user 320 via the GUI 302. The GUI 302 may present to the user a graphical representation of the elements of the directory tree and, in particular, of the file pointers 314 pointing to and representing files stored to the shared storage capacity 113. For example, an icon displayed to the user 320 via the GUIs 302 may represent the file pointer 314. Said icon may not be discernible from an icon of a real file. Thus, user 320 has the impression of accessing a real file 313 stored to his or her local file directory tree although actually said user 320 accesses only a file pointer 316 stored to his/her user-private storage 316, whereby said pointer points to file 313 on the shared storage capacity 113.

The user-private storage 317 may be assigned to a different user. UPS 317 may also comprise a pointer 315 pointing to file 313. The file 313 may have assigned an access list comprising the user-IDs of the users assigned to the UPS 316 and UPS 317.

The invention claimed is:

1. A method for optimizing storage allocation in a virtual desktop environment, the virtual desktop environment managing a shared storage capacity, wherein the shared storage capacity is operable to store one or more first files, each stored first file being associated with a respective unique first file identifier, the virtual desktop environment providing at least one virtual desktop to a processing device of a user, the method comprising:
   receiving a first write request for writing a second file specified in the request;
   determining a second file identifier of the specified second file;
   prior to storing the second file in the shared storage capacity, comparing the second file identifier with the first file identifier of each first file stored in the shared storage capacity;
   in response to the second file identifier matching one of the first file identifiers, creating, in a user private storage, having a local file system representation, assigned to the user, a pointer to the stored first file associated with that first file identifier, wherein the pointer points to a storage location of the stored first file in the shared storage capacity, and wherein the second file is not stored to the shared storage capacity; and
   in response to the second file identifier not matching any of the first file identifiers, storing the specified second file associated with the second file identifier in the shared storage capacity, wherein the second file identifier is stored as a further first file identifier and the second file is stored as a further first file, and creating the pointer to the stored further first file in the user private storage, wherein the user private storage is one of a plurality of user private storages, for a plurality of users, stored in a storage medium of the virtual desktop environment, and wherein each user private storage is only accessible by an associated user such that other users are not able to access the user private storage; and
   outputting, to the processing device, an icon representing the pointer in the at least one virtual desktop that is a same type of icon as an icon for a stored first file.

2. The method according to claim 1, wherein the first write request is received from the at least one virtual desktop, and wherein the pointer is created in the local file system of the user private storage associated with the user and the at least one virtual desktop.

3. The method according to claim 2, further comprising:
   receiving a specification of a path within the local file system of the at least one virtual desktop from the user of the at least one virtual desktop, wherein the pointer is created in a location within the local file system indicated by the specified path.

4. The method according to claim 1, further comprising:
   in response to at least one of storing any of the first files or storing the second file in the shared storage capacity, associating a corresponding one of the first or second file with an access control list comprising user IDs of all users having access to the stored first file or second file; and
   in response to at least one of storing any of the first files or storing the second file in the shared storage capacity, associating a corresponding one of the first or second file with a reference count representing a number of users having access to the stored first or second file.

5. The method according to claim 4, wherein creating the pointer further comprises at least one of adding the user ID to the access control list or incrementing the reference count, wherein the reference count counts a number of users having access to a corresponding file in the shared storage capacity.

6. The method according to claim 4, wherein storing the specified second file comprises:
   creating the access control list and the reference count for the specified second file; and
   adding the user ID to the access control list and incrementing the reference count.

7. The method according to claim 1, further comprising:
   receiving a second write request for writing the second file; and
   creating a second pointer to the existing first file having been stored in response to a first write request, the second pointer being created in the local file system of the virtual desktop at a different location in the local file system than the first pointer.

8. The method according to claim 7, wherein in case the first and the second write requests are received from a same user, the reference count remains unchanged.

9. The method according to claim 1, wherein the virtual desktop is provided by the virtual desktop environment as an instance of a virtual machine image, the virtual desktop comprising a graphical interface which is displayed to the user via a screen of the processing device.

10. The method according to claim 1, wherein the user is one of a plurality of users respectively having assigned a user-specific processing device, wherein the virtual desktop is one out of a plurality of virtual desktops, wherein each of the plurality of virtual desktops is provided to one of the processing devices by the virtual desktop environment, wherein a server hosting the virtual desktop environment is connected to each of the user-specific processing devices via a network, and wherein the method is executed by a storage infrastructure manager running on the server.

11. The method of claim 1, further comprising:
receiving a delete request from the user, the delete request being indicative of one of the first files; and
in response to receiving the delete request:
removing the user ID of that user from the access control list of that file indicated in the deletion request;
decrementing a counter associated with the indicated one of the first files in response to removing the user ID of that user from the access control list of that file, wherein the counter counts a number of users that have access to that file; and
in response to the counter reaching zero in response to the decrementing, deleting that file from the shared storage capacity.

12. A computer system for optimizing storage allocation in a virtual desktop environment, the virtual desktop environment managing a shared storage capacity, wherein the shared storage capacity is operable to store one or more first files, each stored first file being associated with a respective unique first file identifier, the virtual desktop environment providing at least one virtual desktop to a processing device of a user, the computer system comprising:
the shared storage capacity; and
a server processing device hosting a virtual storage infrastructure manager, wherein the virtual storage infrastructure manager is configured for:
receiving a first write request for writing a second file specified in the request;
determining a second file identifier of the specified second file;
prior to storing the second file in the shared storage capacity, comparing the second file identifier with the first file identifier of each of the first files stored in the shared storage capacity;
in response to the second file identifier matching one of the first file identifiers, creating, in a user private storage assigned to the user, a pointer to the stored first file associated with that first file identifier, wherein the pointer points to a storage location of the stored first file in the shared storage capacity, and wherein the second file is not stored to the shared storage capacity; and
in response to the second file identifier not matching one of the first file identifiers, storing the specified second file associated with the second file identifier in the shared storage capacity, wherein the second file identifier is stored as a further first file identifier and the second file is stored as a further first file, and creating a pointer to said further first file in the user private storage, wherein the user private storage is one of a plurality of user private storages, for a plurality of users, stored in a storage medium of the virtual desktop environment, and wherein each user private storage is only accessible by an associated user such that other users are not able to access the user private storage; and
outputting, to the processing device, an icon representing the pointer in the at least one virtual desktop that is a same type of icon as an icon for a stored first file.

13. The computer system according to claim 12, wherein the client processing device is operable to request the virtual desktop assigned to the user from the virtual desktop environment, wherein the client processing device is connected to the server processing device via a network.

14. A computer program product comprising a non-transitory computer readable medium having a computer readable program stored therein, wherein the computer readable program, when executed on a computing device having a shared storage capacity, causes the computing device to:
receive a first write request for writing a second file specified in the request;
determine a second file identifier of the specified second file;
prior to storing the second file in the shared storage capacity, comparing the second file identifier with a first file identifier of each first file stored in the shared storage capacity;
in response to the second file identifier matching one of the first file identifiers, create, in a user private storage assigned to the user, a pointer to the stored first file associated with that first file identifier, wherein the pointer points to a storage location of the stored first file in the shared storage capacity, and wherein the second file is not stored to the shared storage capacity; and
in response to the second file identifier not matching any of the first file identifiers, store the specified second file associated with the second file identifier in the shared storage capacity, wherein the second file identifier is stored as a further first file identifier and the second file is stored as a further first file, and creating the pointer to the stored further first file in the user private storage, wherein the user private storage is one of a plurality of user private storages, for a plurality of users, stored in a storage medium of the virtual desktop environment, and wherein each user private storage is only accessible by an associated user such that other users are not able to access the user private storage; and
output an icon representing the pointer in the at least one virtual desktop that is a same type of icon as an icon for a stored first file.

15. The computer program product according to claim 14, wherein the first write request is received from the at least one virtual desktop, and wherein the pointer is created in the local file system of the user private storage associated with the user and the at least one virtual desktop.

16. The computer program product according to claim 15, further comprising:
receiving a specification of a path within the local file system of the at least one virtual desktop from the user of the at least one virtual desktop, wherein the pointer is created in a location within the local file system indicated by the specified path.

17. The computer program product according to claim 14, further comprising:
in response to at least one of storing any of the first files or storing the second file in the shared storage capacity, associating a corresponding one of the first or second file with an access control list comprising user IDs of all users having access to the stored first file or second file; and
in response to at least one of storing any of the first files or storing the second file in the shared storage capacity, associating a corresponding one of the first or second file with a reference count representing a number of users having access to the stored first or second file.

18. The computer program product according to claim 17, wherein storing the specified second file comprises:
creating the access control list and the reference count for the specified second file; and adding the user ID to the access control list and incrementing the reference count.

19. The computer program product according to claim 14, further comprising:

receiving a second write request for writing the second file; and creating a second pointer to the existing first file having been stored in response to a first write request, the second pointer being created in the local file system of the virtual desktop, wherein in case the first and the second write requests are received from a same user, the reference count remains unchanged.

20. The computer program product of claim 14, wherein the computer readable program further causes the computing device to:

receiving a delete request from the user, the delete request being indicative of one of the first files; and in response to receiving the delete request:

removing the user ID of that user from the access control list of that file indicated in the deletion request;

decrementing a counter associated with the indicated one of the first files in response to removing the user ID of that user from the access control list of that file, wherein the counter counts a number of users that have access to that file; and in response to the counter reaching zero in response to the decrementing, deleting that file from the shared storage capacity.

* * * * *